US009254856B2

(12) United States Patent
Oachs

(10) Patent No.: US 9,254,856 B2
(45) Date of Patent: Feb. 9, 2016

(54) QUICK SERVICE CART

(71) Applicants:Bosch Automotive Service Solutions Inc., Warren, MI (US); Robert Bosch GmbH, Stuttgart (DE)

(72) Inventor: Josh Oachs, Burnsville, MN (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/603,021

(22) Filed: Jan. 22, 2015

(65) Prior Publication Data

US 2015/0210306 A1 Jul. 30, 2015

Related U.S. Application Data

(60) Provisional application No. 61/931,383, filed on Jan. 24, 2014.

(51) Int. Cl.
| | |
|---|---|
| *B62B 3/00* | (2006.01) |
| *B05B 9/00* | (2006.01) |
| *B08B 3/02* | (2006.01) |
| *B05B 9/04* | (2006.01) |
| *B62B 5/06* | (2006.01) |
| *B62B 1/12* | (2006.01) |

(52) U.S. Cl.
CPC . *B62B 3/005* (2013.01); *B62B 3/00* (2013.01); *B05B 9/007* (2013.01); *B05B 9/0403* (2013.01); *B08B 3/026* (2013.01); *B62B 1/12* (2013.01); *B62B 5/067* (2013.01)

(58) Field of Classification Search
CPC ............ B62B 3/00; B62B 1/12; B62B 5/067; B05B 9/007; B05B 9/0403; B08B 3/026
See application file for complete search history.

(56) References Cited

U.S. PATENT DOCUMENTS

| | | | | |
|---|---|---|---|---|
| 3,116,936 | A * | 1/1964 | Magarian | 280/47.19 |
| 4,366,998 | A * | 1/1983 | Kaiser | 312/235.1 |
| 5,518,310 | A * | 5/1996 | Ellman et al. | 312/249.12 |
| 7,204,374 | B2 * | 4/2007 | Marek | 211/70.6 |
| 7,562,780 | B2 * | 7/2009 | Gilpatrick | B08B 3/026 211/70.6 |
| 8,398,097 | B2 * | 3/2013 | Junk | B08B 3/026 123/195 R |
| 8,608,260 | B2 * | 12/2013 | Wishlade | 312/319.8 |
| 2005/0189437 | A1 * | 9/2005 | Alexander | B08B 3/026 239/332 |
| 2005/0217708 | A1 * | 10/2005 | Otterson | E01H 1/101 134/34 |
| 2006/0244228 | A1 * | 11/2006 | Huguet | 280/47.35 |
| 2007/0207042 | A1 * | 9/2007 | Hahn | B08B 3/026 417/234 |
| 2010/0108781 | A1 * | 5/2010 | Terrizzi | B08B 3/026 239/332 |
| 2012/0007483 | A1 * | 1/2012 | Wishlade | 312/237 |

* cited by examiner

*Primary Examiner* — Brodie Follman
*Assistant Examiner* — Hilary L Johns
(74) *Attorney, Agent, or Firm* — Maginot Moore & Beck LLP

(57) ABSTRACT

A quick service cart is provided with multiple functionality including a conventional cabinet structure that allow the technician to store tools and instruments for use in servicing or repairing a vehicle. The drawers of the cabinet are configured to prevent the drawers from tipping the cart over when fully extended. The cart also includes features for connecting to electrical and pneumatic tools and instruments, as well as structure for supporting separate tools, instruments and accessories. The cart includes a pair of handles that are ergonomically configured and positioned to facilitate moving the cart with minimal effort and minimal risk of tipping the cart over.

20 Claims, 11 Drawing Sheets

QUICK SERVICE CART

PRIORITY CLAIM

This application is a non-provisional of and claims priority to provisional application No. 61/931,383, filed on Jan. 24, 2014, the entire disclosure of which is incorporated herein by reference.

BACKGROUND

The present disclosure relates to service facilities and in particular to service carts used by technicians in such facilities.

Servicing vehicles, such as for repair or maintenance, usually requires a wide array of tools, ranging from manual tools such as screwdrivers and socket wrenches, to pneumatic tools, such as air wrenches, and several types of diagnostic tools, such as electrical instruments. In most facilities, the tools and instruments required by the service technician(s) are housed in cabinets and work benches that line the perimeter of the service facility. Depending upon the type of service being performed, the technician(s) may require ready access to several tools and instruments, and more significantly may require ready access at a part of the vehicle that is distant from the cabinet or work bench.

In order to address this concern, mobile tool boxes have been provided so that the technician can have immediate access to the tools at any location within the facility. However, the mobile tool box is generally limited to manual tools, or at best cordless electric tools. Moreover, the typical mobile tool box carries every tool used by the technician, which leads to a very heavy, difficult to move tool box.

Consequently, there is a need for a mobile component that carries multiple types of tools and instruments, that is easily moved anywhere in a maintenance or service facility and that allows the technician to have immediate ready access to manual, pneumatic and electrical tools and instruments.

SUMMARY

A quick service cart is provided comprising a base with a plurality of wheels supporting the base for rolling movement, an upper cabinet structure, a plurality of vertical beams supporting the upper cabinet structure vertically offset from the base, and a pair of handles fastened to a corresponding pair of vertical beams at a vertical position at or near the middle of the length of the pair of vertical beams, each handle including a generally horizontally extending bar and a generally vertically oriented hand grip. In one aspect, the pair of handles are spaced apart a horizontal width sufficient to support a vehicle tire. In a further aspect, the base, at least two of the plurality of wheels, and the pair of handles are configured so that the hand grips of the pair of handles are closely vertically aligned with the at least two of the plurality of wheels.

In one feature of the service cart, the cabinet structure includes opposite side walls and a plurality of tool holders extending outward from at least one of the side walls. The plurality of tool holders can include a bracket defining a plurality of openings sized to receive differently sized screw drivers, a bracket defining a plurality of openings sized to receive differently sized torque sticks, and a bracket configured to support a pneumatic tool. The cabinet structure may be provided with a flat upper plate at the top of the cart, the upper plate having a non-slip surface and a magnetic element disposed on a top surface of the structure.

In a further feature, the service cart includes components for connecting the cart and its components to an electrical and pneumatic source. For instance, the cart may include an electrical power strip mounted on the base. The cart may further include at least one hose reel mounted underneath the upper cabinet structure, the reel including a coiled hose. A free end of the coiled hose extends from the hose reel through an opening in the upper cabinet structure for access by a technician. A fluid inlet assembly fluidly coupled to one end of the coiled hose and having an inlet fitting adapted to fluidly couple to a source of fluid, such as pressurized air. In one aspect, the cart includes two hose reels mounted perpendicular to each other at one corner of the upper cabinet structure, with the free end of the coiled hose of each of the two hose reels extending through a corresponding opening in the cabinet structure.

DETAILED DESCRIPTION

Figure 1:
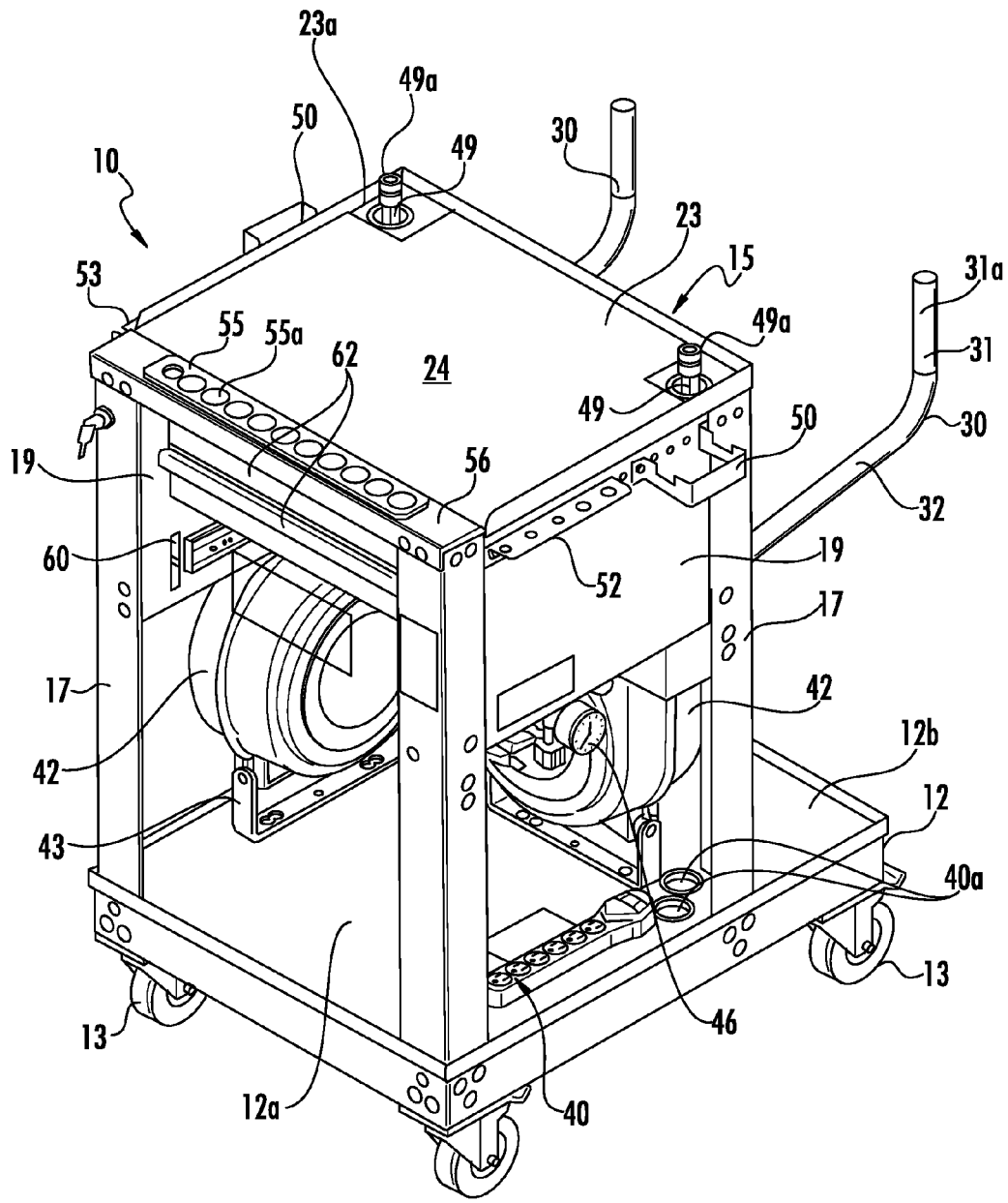
FIG. 1 is a perspective view of a quick service cart according to one aspect of the present disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

A quick service cart 10 is provided according to certain features of the present disclosure, as depicted in FIGS. 1-14. The cart 10 includes a base 12 with a base plate 12a providing the foundation for supporting the components of the cart. The base includes several caster wheels 13, typically four such wheels distributed among each corner of the base. The base and caster wheels are designed to support not only the other components of the cart but also the several tools and instruments to be carried by the cart. The caster wheels may be provided with typical caster brakes to prevent the cart from rolling away while the technician is working. The cart 10 further includes an upper cabinet structure 15 supported by several support beams 17. The support beams may be right angle beams for bending strength and to maintain free space within the interior of the beams. As shown in FIG. 1, the vertical beams are fastened to the base 12 in a conventional manner, such as by carriage bolts, and may pass through the base plate 12a for additional rigidity.

The upper cabinet structure 15 is formed by side panels 19 and a rear panel 20 (FIG. 2), each of which is fastened to the vertical support beams 17 in a conventional manner, such as by screws or welding. The side and rear panels add further strength and rigidity to the cart structure. In one embodiment the side and rear panels are formed of sheet metal, such as stainless steel or aluminum. These frame components of the cart may be treated or coated to be able to withstand the fluids and compositions faced in a typical service facility, such as oil and de-greaser compositions. The upper cabinet structure 15 is closed at the top by a top plate 23 that is fastened to the side and rear plates as well as the vertical beams, again adding strength and rigidity to the frames structure of the cart 10.

The service cart may be configured with the top plate 23 at a height of about three feet (36-38 ins.) which is convenient for use as a work surface by the technician. The upper cabinet structure 15 may be supported above the base 12 to provide a clearance of about one foot (12 ins.) for carrying and storage of tools, parts and components. The cart, or more particularly the base, may have a width of about 21 ins. and a length of about 27 ins. with the wheels 13 disposed at the corners of the base to provide a stable wheelbase for the cart.

The top plate may be provided with a rubber mat 24 to provide a non-slip, corrosion resistant surface on which the technician can place tools, instruments and even vehicle parts. The front edge of the cabinet structure 15 may be provided with a front beam 56 spanning the width of the cart. A magnet array 55 may be fastened to the front beam in a conventional manner, such as by screws or adhesive. The magnet array 55 may include several discrete magnet elements 55a, as depicted in FIG. 1, or may include a magnetized strip. The magnet array 55 provides a place to securely hold metal components, such as nuts and bolts from the vehicle, while keeping the components handy for the technician.

Handles 30 are provided to assist the technician in moving the cart. Each handle 30 includes a generally vertical grip bar 31 that may be covered with a grip 31 to prevent slipping. The grip may be formed from a plastic, such as PVC, or a foam material. Each handle further includes a generally horizontal or slightly angled attachment bar 32 that extends from the grip bars, preferably integrally. In one embodiment, the handles may be oriented at a horizontal angle of less than about five degrees (5°).

Figure 2:
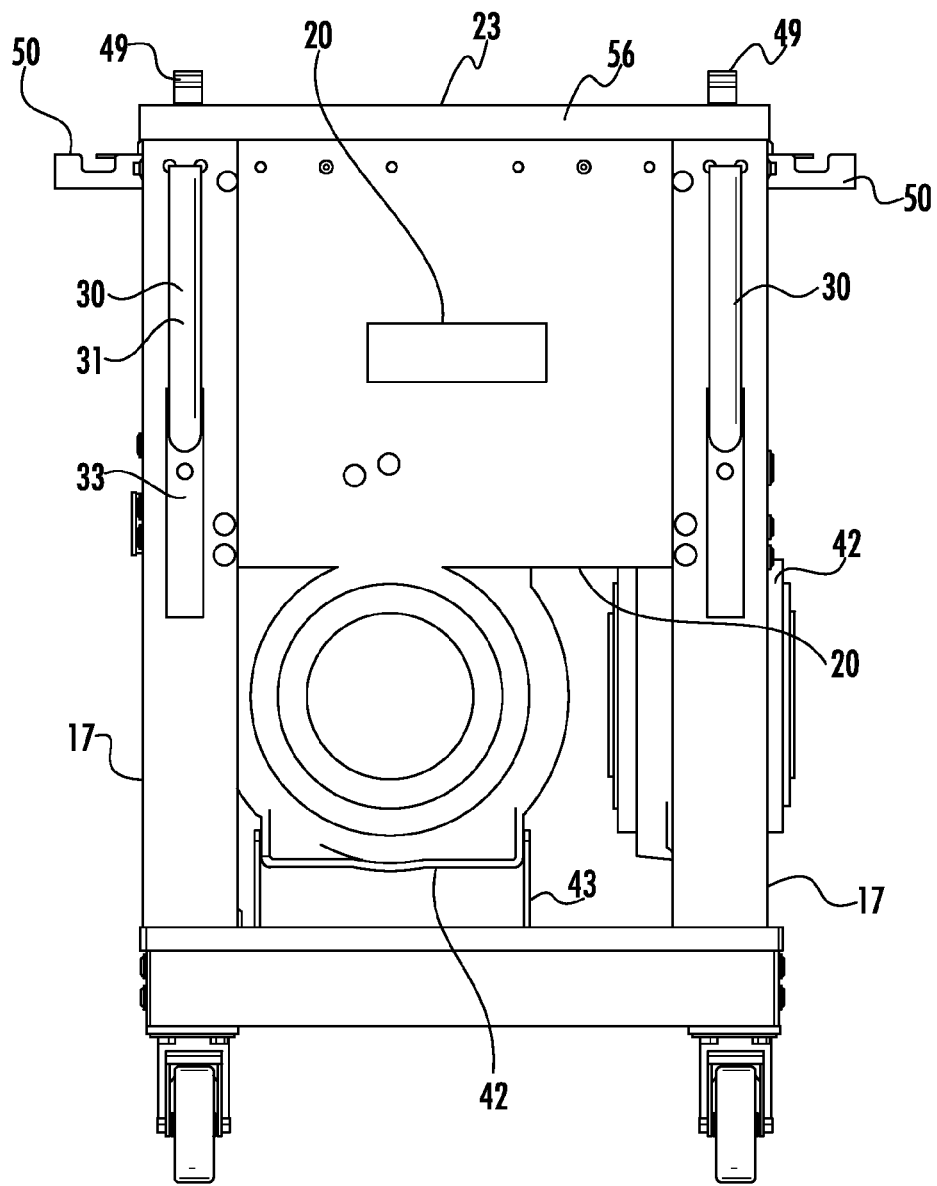
FIG. 2 is a rear end view of the quick service cart shown in FIG. 1.
Figure 4:
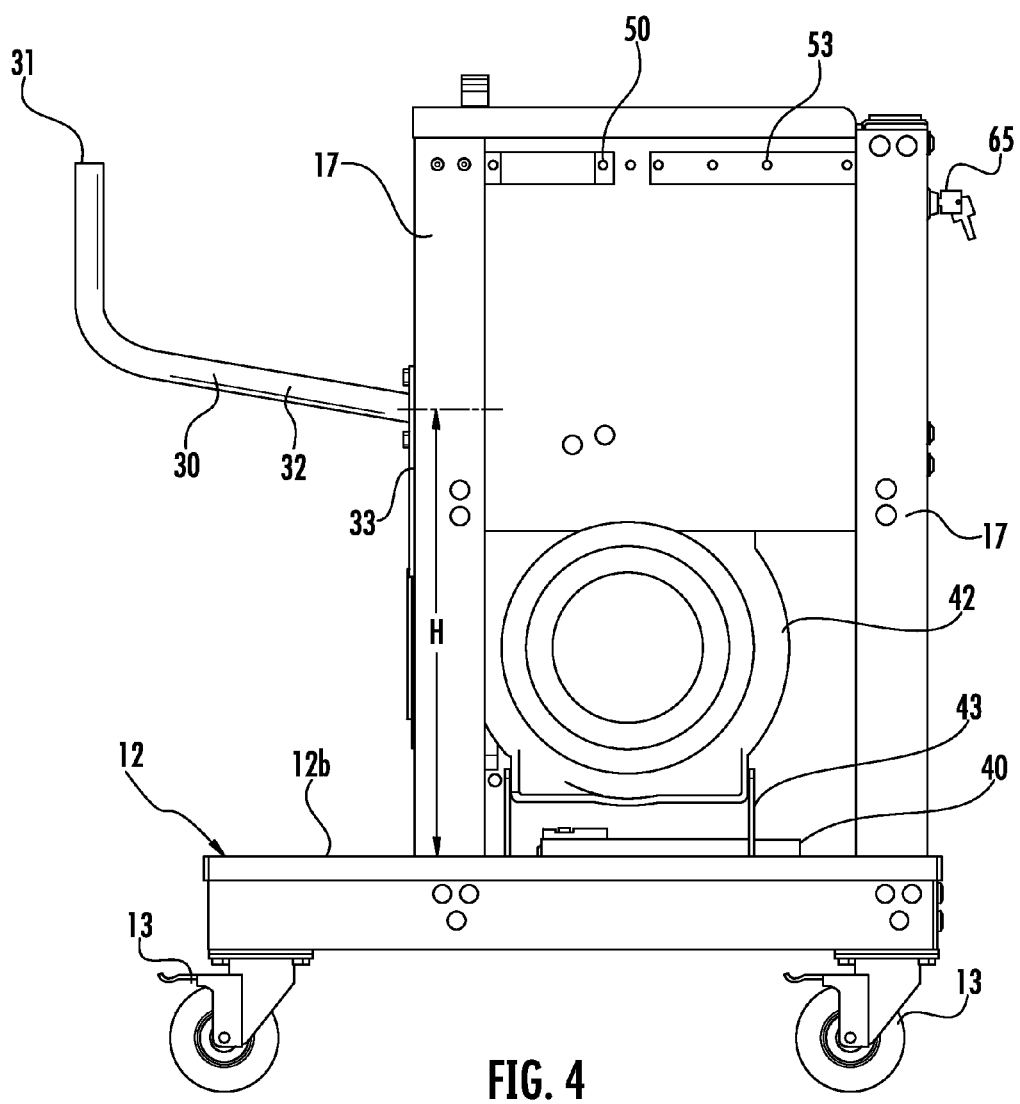
FIG. 4 is a right side view of the quick service cart shown in FIG. 1.

The attachment bar 32 merges into an attachment plate 33, also preferably integrally. In one feature, each handle 30 is integrally formed or molded as a single piece. The attachment plate 33 is fastened to a vertical beam 17 using conventional fasteners. The integral handle and attachment plate structure provides for a more secure attachment to the cart 10 than in other forms of handle attachment that use multiple mounting plates. As shown in FIGS. 1, 2 and 4 the handles 40 are spaced apart at a width for the technician to comfortably grasp the grip bars 31, typically shoulder-width apart. In a further aspect, the handles 30 are mounted to the cart at a height H (FIG. 4) that is at a vertical position that is at or about half the length of the vertical beams, or slightly over half the overall height of the vertical beams 17. This position of the handles means that the force applied to the cart 10 as the technician pushes on the handles 30 is applied close to the center of gravity of the cart, making it easier to move the cart while minimizing the risk of tipping the cart over if too much pushing force is applied. The support bar 32 may be angled upward slightly so that the vertical grip bars 31 are positioned at a comfortable height for the technician to grasp and push while providing an optimum mechanical advantage. In one specific embodiment, the cart 10 has a height of about 37 in., while the top of the grip bars 31 is at about 35 in.

Figure 7:
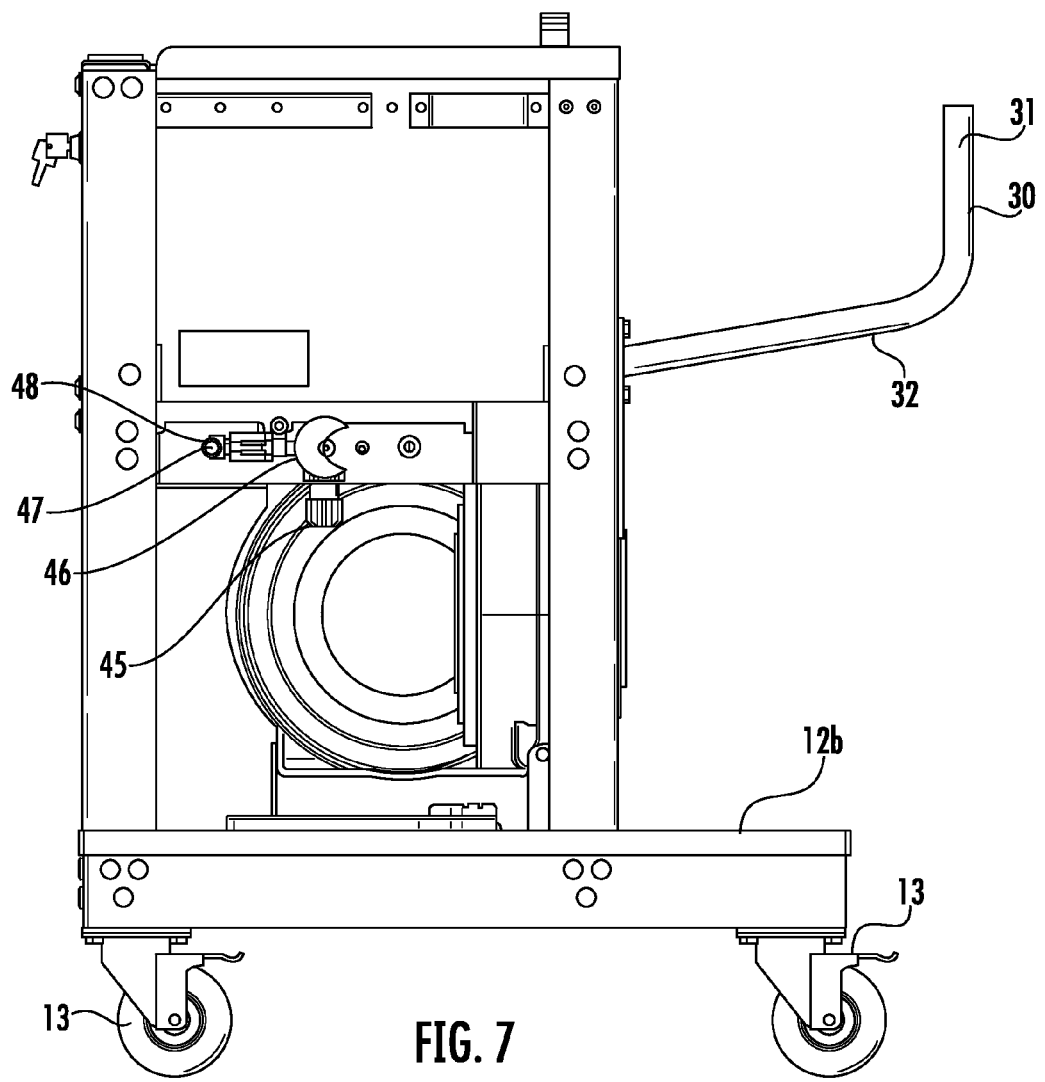
FIG. 7 is a left side view of the quick service cart shown in FIG. 1.

In one aspect, the base 12 may include an extended portion 12b that extends beyond the upper cabinet structure 15 and the support beams 17, as best seen in FIGS. 1, 4 and 7. The extended portion 12b is outside the support frame to provide an unimpeded surface to store equipment or components. In addition, as seen in these figures, two of the caster wheels 13 are mounted at the end of the portion 12b. The handles 30 are arranged so that the attachment bars 32 are generally co-extensive with the extended portion 12b of the base with the grip bars 31 extending vertically upward slightly outboard of the end of the extended portion 12b. This arrangement helps stabilize the cart 10 as it is being pushed using the handles and ensures that any moment generated as the handles are pushed is contained within the four corners of the base 12 and within the perimeter of the caster wheels 13.

The quick service cart 10 of the present disclosure is configured to provide access to a wide range of tools and instruments. Consequently, in one feature a power strip 40 may be fastened to the base 12 or base plate 12a. The base plate 12a may define a number of openings 40a for passage of a power cable to connect the power strip to a fixed outlet in the service facility.

Figure 3:
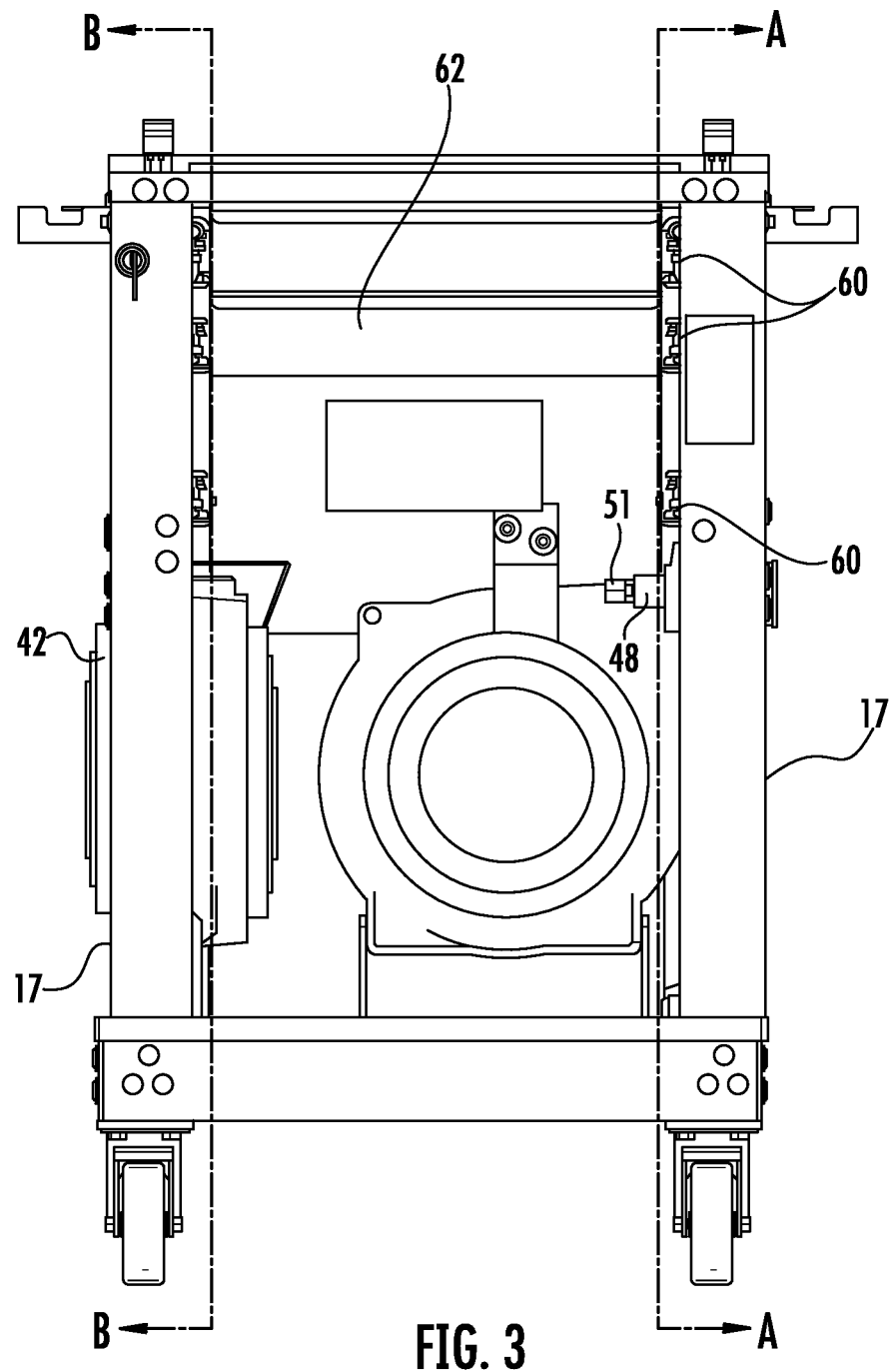
FIG. 3 is a front end view of the quick service cart shown in FIG. 1.
Figure 6:
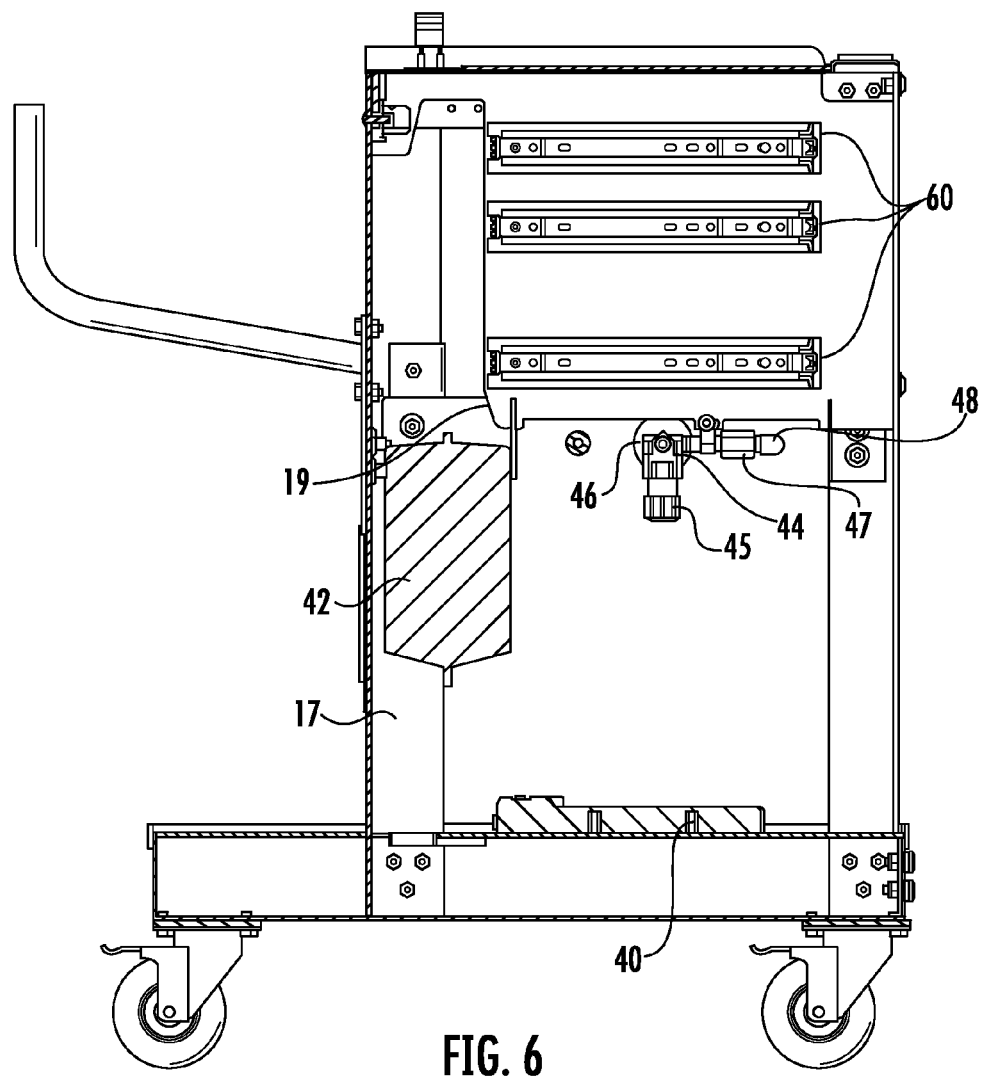
FIG. 6 is a right side cross-sectional view of the quick service cart shown in FIG. 1 and the cross-section taken along line A-A of FIG. 3.

In another feature, the cart 10 may carry one or more air hose reels assemblies 42. Each reel assembly can be supported by a U-bracket 43 that is mounted to the base plate 12a in a conventional manner. As best shown in FIGS. 1, 3 and 6 two reel assemblies 42 are supported in the volume between the base plate and the upper cabinet structure 15. In order to keep as much of this volume free for use by the technician, the reel assemblies are arranged perpendicular to each other and bordering a corresponding side of the frame structure. Thus, one reel assembly is aligned with the right side of the cart, partially overlapping the vertical beams 17, as shown in FIG. 3. The other reel assembly 42 is aligned with the back side of the cart facing the handles 30, also partially overlapping the vertical beams, as shown in FIG. 6.

Figure 8:
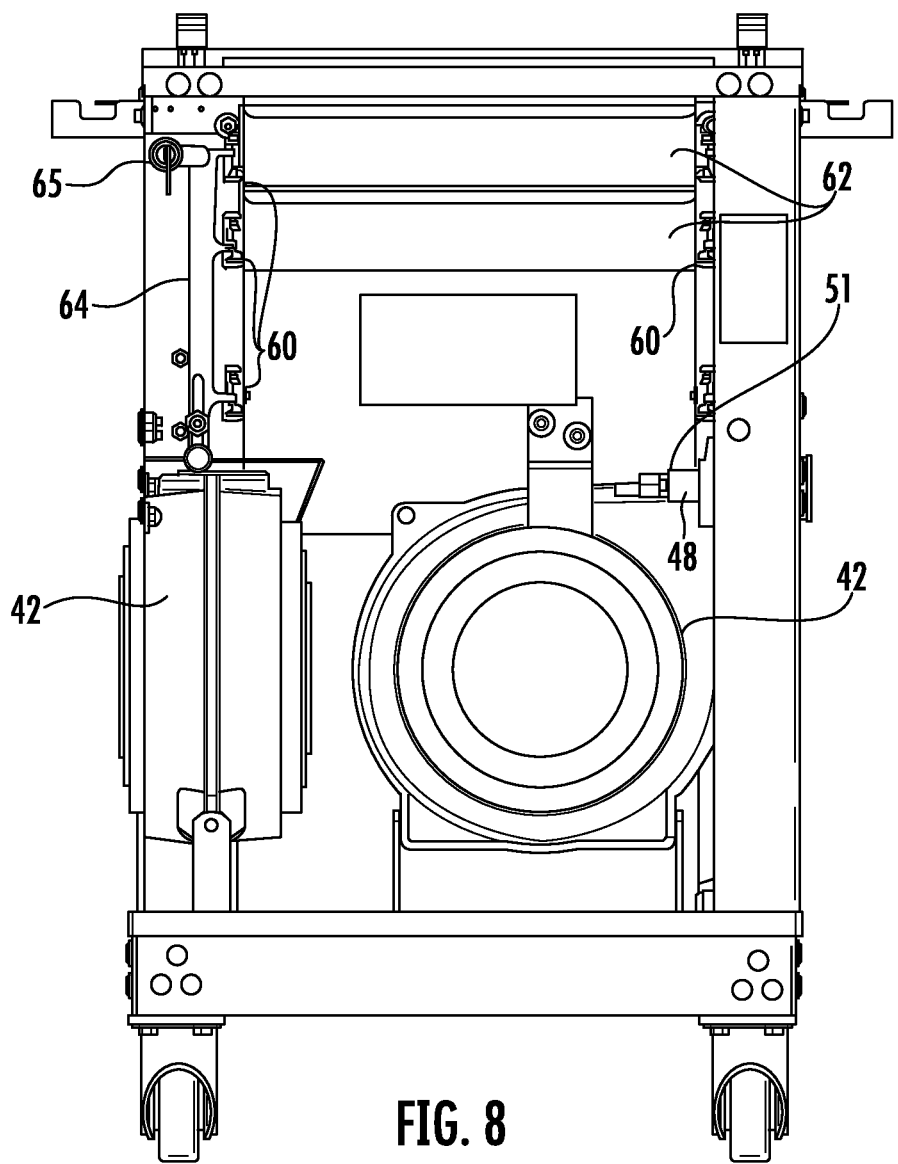
FIG. 8 is rear end partial cut-away view of the quick service cart shown in FIG. 1.

Each hose reel assembly is connected to an air inlet assembly 44, as depicted in FIG. 6. The inlet assembly may include an inlet regulator 45 configured to be coupled to an external supply of pressurized air via a conventional pneumatic hose. A pressure gauge 46 is provided between the regulator and the air hose carried by the air hose reel assembly 42. The cart-based air hose may be connected to the regulator and gauge through an elbow fitting 48 and a fitting 51 (FIG. 8). The air inlet assembly 44 is supported on the side panel 19 for one hose reel assembly and on the rear panel 20 for the other reel assembly 42. The hose 49 for each hose reel assemblies is accessible at the top of the cart. In particular, each hose 49 passes through an opening 23a in the top plate 23 and is provided with a quick-connect fitting 49a for quick and easy attachment by the technician to a pneumatic tool. Each hose reel assembly 42 may be configured to dispense the air hose as the technician pulls the hose 49 through the opening 23a, and to automatically retract the hose when released by the technician.

Figure 9:
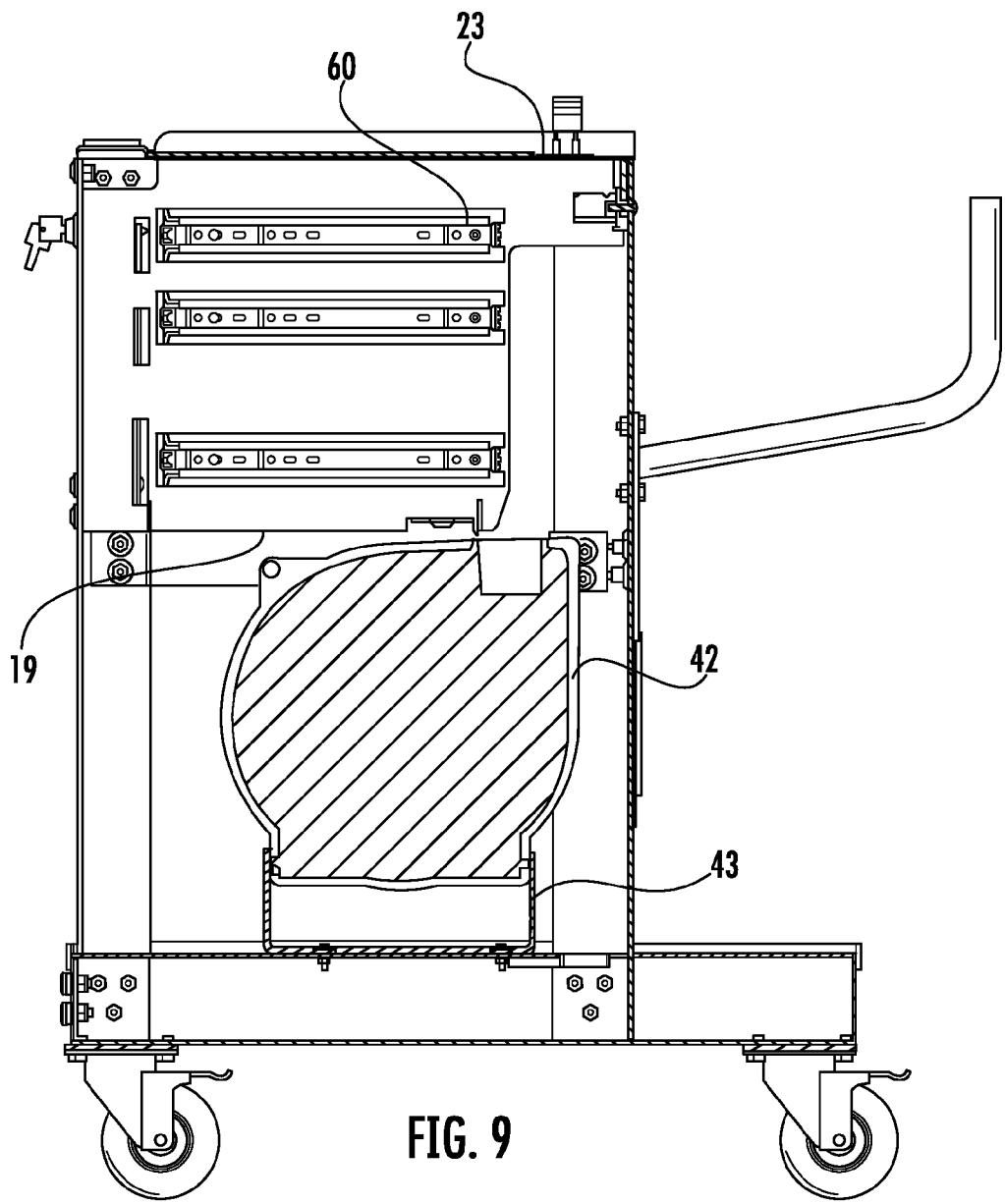
FIG. 9 is a left side partial cut-away view of the quick service cart shown in FIG. 1 taken along line B-B in FIG. 3.

The quick service cart 10 disclosed herein is configured to provide ready access for the technician to all the tools and instruments needed to service or repair a vehicle. Consequently, the upper cabinet structure includes a number of drawers for storing the technician's tools and instruments. Pairs of drawer slides 60 are fastened to the side panels 19 of the cart, as shown in FIGS. 6 and 9. In one embodiment, three rows of drawer slides 60 are provided. Two drawers 62 are shown disposed within the uppermost drawer slides, as shown in FIGS. 1 and 3. As seen in FIG. 1, the front of the two uppermost drawers is recessed inward from the open front of the cart. In one embodiment, while the drawer slides 60 are configured to accommodate a drawer with a depth (or length) of 15.5 in., the drawers themselves may have a depth (or length) of about 8.5-12.0 in. Although not depicted in the figures, the lowermost slides 60 can accept a drawer with a height extending upward from the slide to the bottom of the upper drawers. It is contemplated that each of the drawers will hold many metal tools, so the cantilevered weight in a fully extended drawer could be sufficient to tip the cart over. Consequently, the slides of the two lowermost drawers can be configured to limit the outward travel or extension of the drawers to about 8.5 in. to prevent tipping of the cart when the fully loaded drawers are extended. The uppermost drawer is permitted to extend the full length of the drawer slides 60, namely about 15.5 in, in order to allow full access to the innermost part of the drawer. However, the height of the uppermost drawer limits the size and number of tools that can be stored so the risk of tipping over even when the uppermost drawer is fully extended is minimal. The drawers include a locking mechanism 64 (FIG. 8) at one side of the drawer slides, as is conventional in the art. A key assembly 65 is provided to lock and unlock the mechanism 65. The key assembly 65 is depicted at the front of the cart in FIG. 1, but it is understood that the assembly could be positioned at the rear of the cart.

Figure 5:
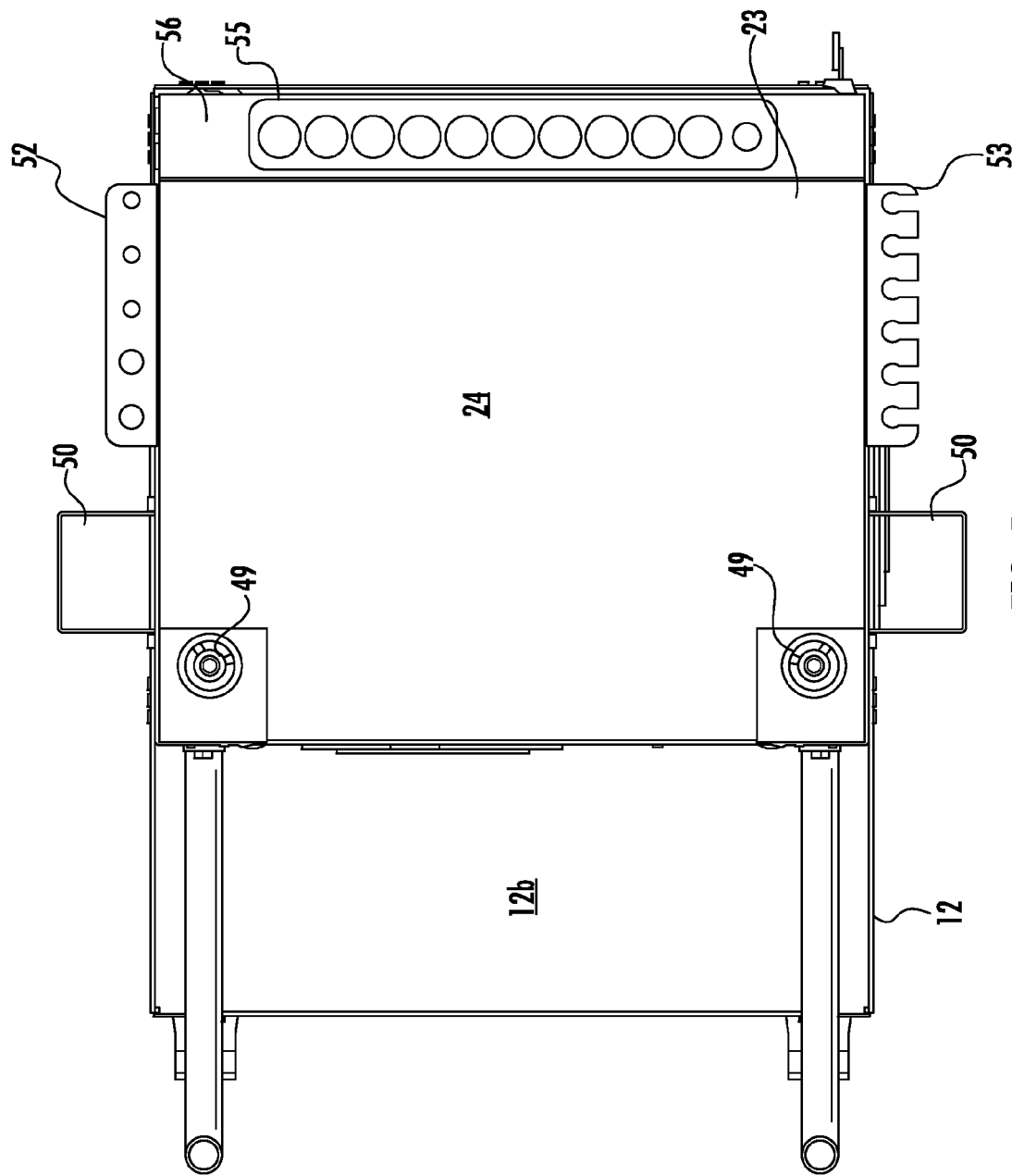
FIG. 5 is a top view of the quick service cart shown in FIG. 1.

In another feature of the quick service cart 10, the cart is provided with means for holding various tools and instruments for ready availability to the technician. Although the cabinet structure provides storage for all of the tools and instruments that might be used by the technician, there is still a benefit to keeping the tools close at hand that are actually being used in the repair or maintenance procedure. Consequently, as shown in FIGS. 1 and 5, the cart 10 is provided with air tool holders 50 on each side panel 19 of the cart to hold a pneumatic tool connected to the air hose 49. Moreover, a screw driver bracket 52 is mounted to one side panel that includes several holes of different diameters to support different size screw drivers. As shown in FIG. 5, the opposite side panel carries a torque stick bracket 53 that includes several open slots for receiving torque sticks for use with a pneumatic impact wrench.

The present disclosure provides a quick service cart with multiple functionality. The cart provides conventional cabinet features that allow the technician to store tools and instruments for use in servicing or repairing a vehicle. The drawers of the cabinet are configured to prevent the drawers from tipping the cart over when fully extended. The cart also carries means for connecting to electrical and pneumatic tools and instruments, as well as structure for supporting the separate tools, instruments and accessories. The cart includes a pair of handles that are ergonomically configured and positioned to facilitate moving the cart with minimal effort and minimal risk of tipping the cart over.

Figure 10:
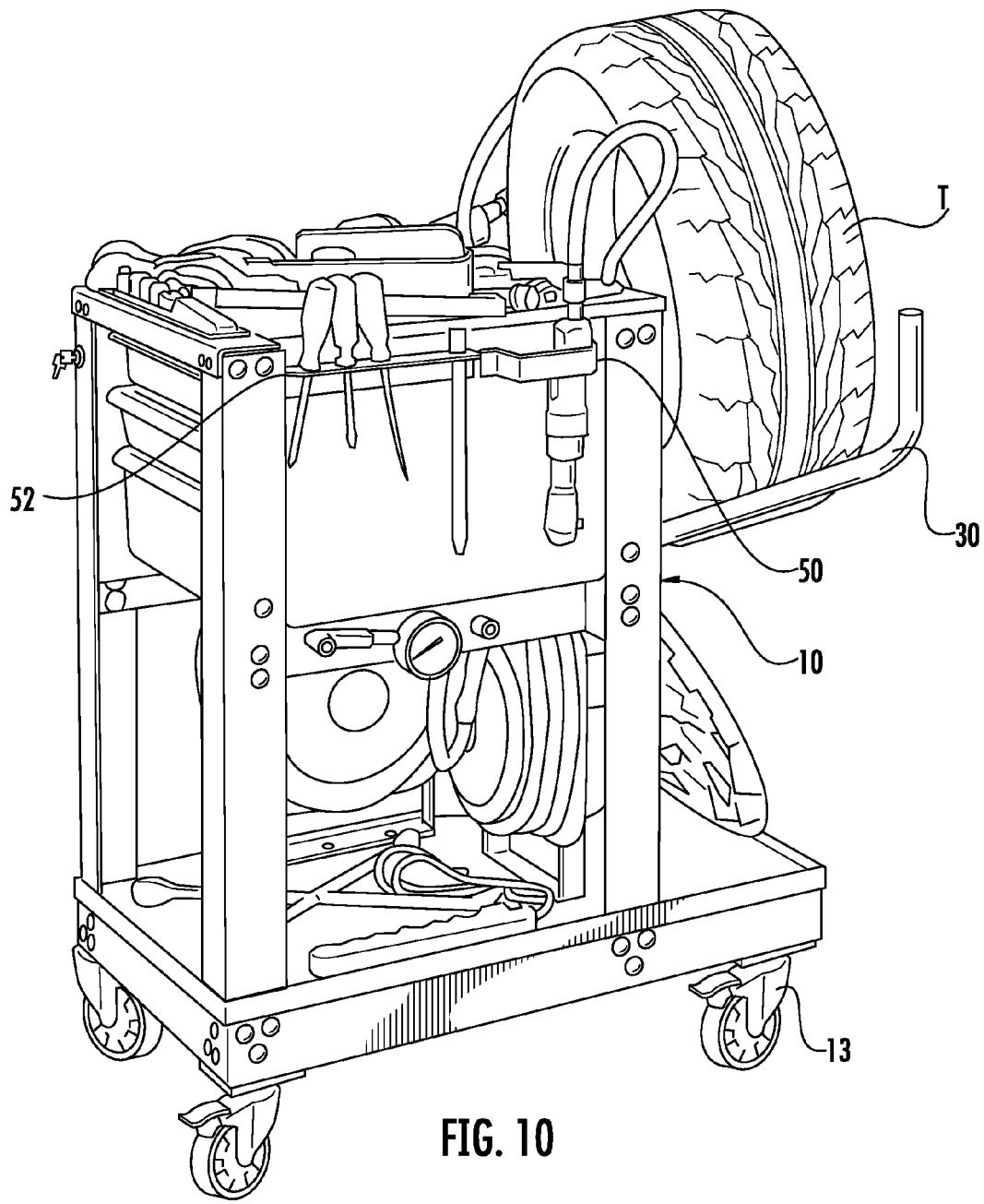
FIGS. 10 and 11 show the quick service cart of FIG. 1 supporting an array of manual tools, air tools and a vehicle tire at a service facility.
Figure 11:
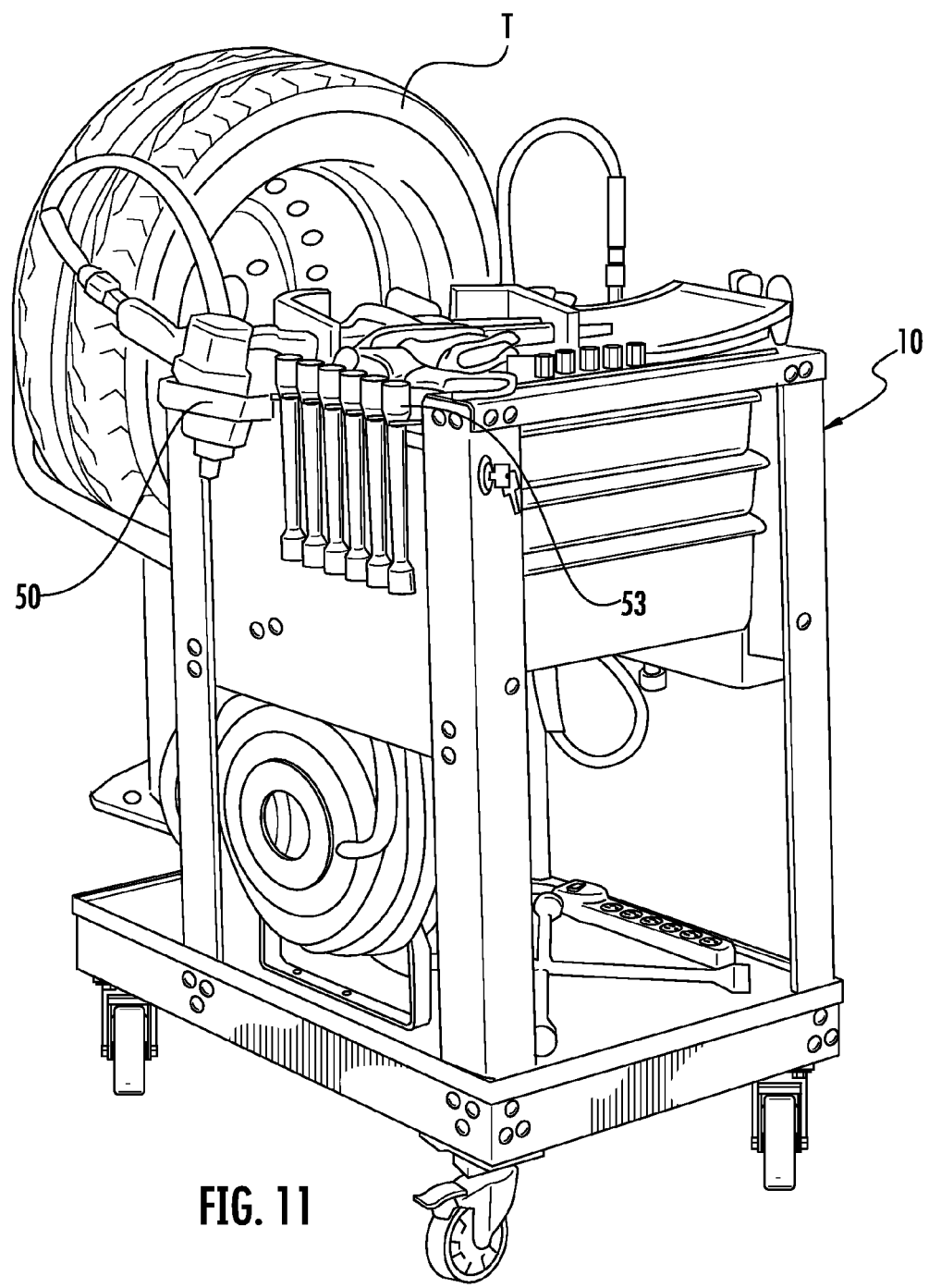

An exemplary cart is shown in use in FIGS. 10-11. As illustrated in these figures, torque sticks and screw drivers are supported within the brackets 52, 53. Pneumatic tools are supported within the brackets 50 and connected to the air supply hoses. In a further feature, a tire or wheel T from the vehicle is supported by the handles 30. In this embodiment, the handles are spaced apart a width that is sufficient to support the tire. It can be appreciated that the handles support the tire generally above one set of caster wheels 13 so that the cantilevered weight is minimal, thereby preventing the cart from tipping over when a tire is supported by the handles. It can also be appreciated that the extended portion 12b of the base maintains the caster wheels 13 in a position so that the line of force of the tire supported by the handles 30 is within the four corners of the base 12 and within the perimeter of the caster wheels 13.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, one or both of the air hose reels 42 may be configured to convey a fluid or gas other than air. For instance, the hose in one reel may be used to supply pressurized water such as for cleaning parts of a vehicle or areas of the shop environment.

What is claimed is:

1. A service cart comprising:
   a base with a plurality of wheels supporting the base for rolling movement;
   an upper cabinet structure;
   a plurality of vertical beams supporting the upper cabinet structure vertically offset from the base; and
   a pair of handles fastened to a corresponding pair of vertical beams at a vertical position at or near the middle of the length of said pair of vertical beams, each handle including a generally horizontally extending bar and a generally vertically oriented hand grip.

2. The service cart of claim 1, wherein said pair of handles are spaced apart a horizontal width sufficient to support a vehicle tire.

3. The service cart of claim 1, wherein said base, at least two of the plurality of wheels, and said pair of handles are configured so that the hand grips of said pair of handles are closely vertically aligned with said at least two of the plurality of wheels.

4. The service cart of claim 1, wherein the generally horizontally extending bar of each of said pair of handles extends at a horizontal angle of less than about five degrees (5°).

5. The service cart of claim 1, wherein said upper cabinet structure includes a number of drawers slidably mounted within the structure.

6. The service cart of claim 5, wherein at least one of the number of drawers is offset inwardly within the cabinet structure.

7. The service cart of claim 1, wherein the cabinet structure includes:
   opposite side walls; and
   a plurality of tool holders extending outward from at least one of the side walls.

8. The service cart of claim 7, wherein one of the plurality of tool holders is a bracket defining a plurality of openings sized to receive differently sized screw drivers.

9. The service cart of claim 7, wherein one of the plurality of tool holders is a bracket defining a plurality of openings sized to receive differently sized torque sticks.

10. The service cart of claim 7, wherein one of the plurality of tool holders is a bracket configured to support a pneumatic tool.

11. The service cart of claim 1, wherein said cabinet structure includes a flat upper plate at the top of the cart, the upper plate having a non-slip surface.

12. The service cart of claim 1, wherein said cabinet structure includes a magnetic element disposed on a top surface of said structure.

13. The service cart of claim 1, further comprising an electrical power strip mounted on said base.

14. The service cart of claim 13, wherein:
said power strip includes an electrical cable for connection to an electrical outlet; and
said base defines an opening for passage of the electrical cable underneath the service cart.

15. The service cart of claim 1, further comprising:
at least one hose reel mounted underneath the upper cabinet structure, the reel including a coiled hose, wherein a free end of the coiled hose extends from said hose reel through an opening in said upper cabinet structure for access by a technician; and
a fluid inlet assembly fluidly coupled to one end of the coiled hose and having an inlet fitting adapted to fluidly couple to a source of fluid.

16. The service cart of claim 15, further comprising two hose reels mounted perpendicular to each other at one corner of said upper cabinet structure, with the free end of the coiled hose of each of said two hose reels extending through a corresponding opening in said cabinet structure.

17. The service cart of claim 16, wherein:
said cabinet structure includes a top plate defining a generally flat support surface; and
said corresponding opening for the coiled hose of each of said two hose reels is disposed in said top plate.

18. A service cart comprising:
a base with a plurality of wheels supporting the base for rolling movement;
an upper cabinet structure;
a plurality of vertical beams supporting the upper cabinet structure vertically offset from the base; and
at least one hose reel mounted underneath the upper cabinet structure, the reel including a coiled hose, wherein a free end of the coiled hose extends from said hose reel through an opening in said upper cabinet structure for access by a technician; and
a fluid inlet assembly fluidly coupled to one end of the coiled hose and having an inlet fitting adapted to fluidly couple to a source of fluid.

19. The service cart of claim 18, further comprising two hose reels mounted perpendicular to each other at one corner of said upper cabinet structure, with the free end of the coiled hose of each of said two hose reels extending through a corresponding opening in said cabinet structure.

20. The service cart of claim 18, wherein:
said cabinet structure includes a top plate defining a generally flat support surface; and
said corresponding opening for the coiled hose of each of said two hose reels is disposed in said top plate.

* * * * *